(12) United States Patent
Devaney et al.

(10) Patent No.: US 7,737,655 B1
(45) Date of Patent: Jun. 15, 2010

(54) ELECTRONIC CONTROL MODULE FOR A LITHIUM-ION BATTERY POWERED LANTERN

(75) Inventors: John P. Devaney, Mountain Top, PA (US); Mark Dirsa, Shavertown, PA (US)

(73) Assignee: Koehler-Bright Star, Inc., Hanover Township, PA (US)

( * ) Notice: Subject to any disclaimer, the term of this patent is extended or adjusted under 35 U.S.C. 154(b) by 860 days.

(21) Appl. No.: 11/460,051

(22) Filed: Jul. 26, 2006

(51) Int. Cl.
*H02J 7/00* (2006.01)

(52) U.S. Cl. ............... 320/106; 320/134; 320/136; 320/150

(58) Field of Classification Search ............... 320/106, 320/134–136, 150
See application file for complete search history.

(56) References Cited

U.S. PATENT DOCUMENTS

| | | | | |
|---|---|---|---|---|
| 1,912,185 A | * | 5/1933 | Froeckman | 324/133 |
| 1,919,891 A | * | 7/1933 | Leingang | 320/125 |
| 5,281,792 A | * | 1/1994 | Lee et al. | 219/209 |
| 5,471,129 A | * | 11/1995 | Mann | 340/636.1 |
| 5,749,346 A | * | 5/1998 | Halvorson et al. | 123/486 |
| 6,744,698 B2 | * | 6/2004 | Koyama et al. | 368/204 |
| 2005/0077878 A1 | * | 4/2005 | Carrier et al. | 320/134 |
| 2006/0265921 A1 | * | 11/2006 | Korall et al. | 40/579 |

* cited by examiner

*Primary Examiner*—Edward Tso
*Assistant Examiner*—Samuel Berhanu
(74) *Attorney, Agent, or Firm*—R. Blake Johnston, Esq.; DLA Piper US LLP

(57) ABSTRACT

A controller allows use of a battery protection circuit that limits electrical current to a safe level regarding short circuits and hazardous locations as well as determining each battery configuration having a voltage-temperature profile associated with that enhances cold weather operation; high battery temperatures are also detected and then rectified by the controller.

14 Claims, 9 Drawing Sheets

ELECTRONIC CONTROL MODULE FOR A LITHIUM-ION BATTERY POWERED LANTERN

BACKGROUND OF THE INVENTION

1. Field of Invention

The present invention is related to battery powered lanterns and lights and more specifically to an electronic control module for a lithium-ion battery powered lantern.

2. Background

It is the goal of every designer of battery-powered devices to prolong battery discharge life as much as possible. Battery life is particularly important in lanterns and other lighting devices used by firefighters and other emergency personal. Use of such battery powered lights in emergency environments is further complicated by the effect of increased or decreased temperatures in which the lights are used.

Li-ion batteries have a higher energy to weight ratio than any other commercially available rechargeable batteries. This makes them very desirable as a power source for portable devices. For safety, most Li-ion battery packs must have a safety circuit to protect them from over voltage, under voltage and over-discharge conditions. This presents some limitations for viable applications of Li-ion batteries. Namely, desired high discharge currents may not be possible because the battery protection circuit will not allow them. This controller safely allows high discharge currents from a Li-ion battery pack by controlling current to the main lamp. It prevents high currents from activating the safety circuit. It is possible to use a safety circuit that would allow higher currents, but this would also allow high currents during undesirable conditions such as a short circuit at the external charging contacts on the lantern. A high current short across these external contacts may result in an unsafe condition during use in hazardous locations.

At lower temperatures, the voltage is depressed. At higher temperatures the voltage is elevated.

Since low temperatures depress the voltage of Li-ion cells, application of a high power load further drops the cell voltage to the point that the protection circuit may activate and disconnect the load due to a low-voltage condition. This effect is further increased as the ratio of the size of the load to the capacity of the battery is increased.

In a typical lantern, main lamp is of the incandescent type, and can be of low power or high power. While a high power lamp produces more light, it draws much more current from the battery. As is well known, higher currents cause the battery to discharge rapidly and thus reduce the useful life of the battery charge. In addition to the nominal current drain resulting from the lamp in the "ON" condition, there is an initial spike of current that is many times the nominal. Further, because of the potential presence of in ignitable vapors, dust or other chemicals, the powering-up sequence of such lights must be carefully controlled as not to create a spark or other harmful electrical discharge. This "turn on" current spike can be large enough to cause a safety circuit, if present, to disconnect the battery from the load or appear as a short.

It is therefore a goal of manufacturers and users of battery powered lanterns to provide control over battery discharge that minimizes battery depletion and provides regulation of the start-up charge to maximize the safe operation of the lanterns in potentially hazardous environments. It is further goal to maximize battery depletion based on the temperature of the battery.

SUMMARY OF INVENTION

The inventive controller allows use of a battery protection circuit that limits electrical current to a safe level regarding short circuits and hazardous locations, and still run a high-power load such as a very bright lamp in this case. Because of this, a lantern is provided that is lighter, smaller and brighter than prior art systems and still be safety listed for use in hazardous locations by third party agencies.

In the program for the controller, each battery configuration has a voltage-temperature profile associated with it. In addition, this controller can identify which of three battery configurations is installed in the lantern, a four, six, or eight-cell battery pack When controller identifies which pack is installed and uses this voltage-temperature information to activate a low battery LED indicator. This indicator alerts the end user that limited run time remains before the lamp goes out.

Another advantage of this controller is the enhancement of cold weather operation. Based on cell temperature, the controller will automatically reduce the power available to the lamp to prevent the cell voltage from reaching the low voltage cutoff point prematurely. As the cells are discharged, even at this lower power setting, heat is generated internally in the cells. This heat increases cell voltage faster than discharging it decreases it. The controller continuously monitors cell temperature, and indirectly the cell voltage, and slowly increases the load on the battery until full lamp power is achieved. This feature allows use of a relatively high power lamp with a small capacity Li-ion battery at low ambient temperatures. High battery temperatures are also detected and then rectified by the controller The controller is also capable of flashing the four high-brightness signaling LEDs at various rates to make the end user highly visible to others in emergency situations. This is very beneficial during smoky conditions encountered by firefighters, first responders to nighttime automotive accidents or any disaster relief workers.

BRIEF DESCRIPTION OF THE DRAWINGS

Specific embodiments of the invention have been chosen for purposes of illustration and description, and are shown in the accompanying drawings, forming a part of the specification wherein.

DETAILED DESCRIPTION OF THE PREFERRED EMBODIMENTS

It shall be understood that reference to the term "lantern" herein shall also include, but not be limited to, flashlights, spotlights and similar illumination devices known in the art.

Hardware

Figure 1:
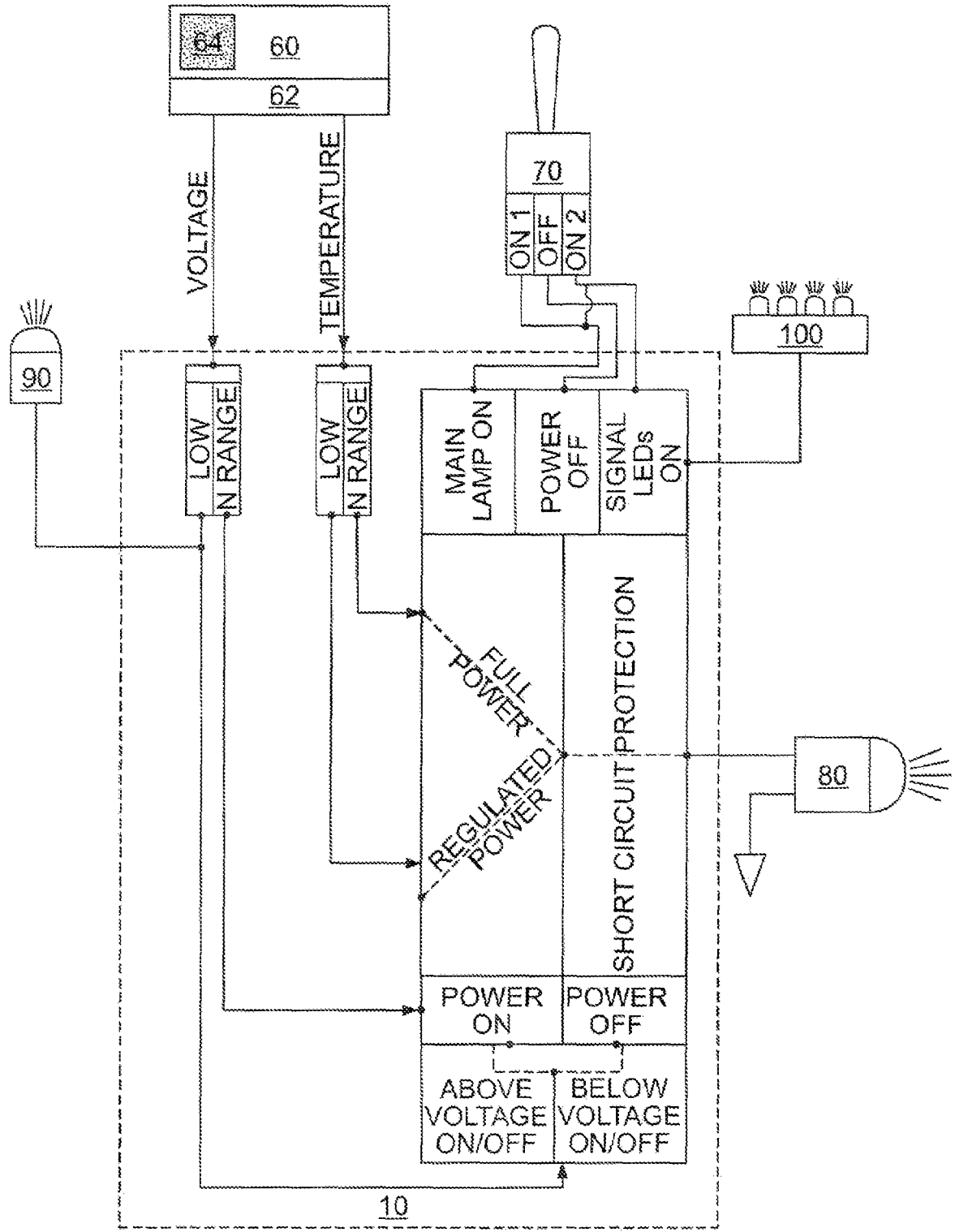
FIG. 1 is a circuit diagram of the battery controller of the instant invention.

Referring now to the schematic of FIG. 1, the inventive controller 10 is coupled to the appurtenant parts of a battery powered lantern. Show here is lithium-ion battery 60, with battery protection circuit 62 and thermister 64, switch 70, main lamp 80 and low battery indicator led 90. Also shown, are signal LEDs (light emitting diodes) 100, that may or may not be provided. In one embodiment, four LEDs are provided and are connected internally into two separate groups of two. The two groups of LEDs can be of different or the same color and they can be programmed to flash in a predetermined sequence or to remain "on" any time the lantern is turned on. The LEDs are high intensity and are intended to be visible at a great distance. It should be noted that the controller could be coupled to additional lantern features not described herein. Further, the structure and operability any of the lantern components described herein with some specificity are but just one embodiment for illustration purposes and be substituted with other relevant components and/or characteristics that are known in the art.

Lithium-ion battery 60 is generally composed of a set 4, 6 or 8 lithium-ion battery cells connected in series-parallel to generate 7.2 volts nominally. Such cells are rated at 3.7 volts and 2200 mAh. The battery protection circuit 62, in connection with the controller 10 as described below, prevents the battery 60 from overcharging, over discharging and from an external short. Further, the battery protection circuit 62 disconnects the load from the battery when one of the aforementioned conditions is detected. The thermister 64 is also used by the controller 10 to measure the temperature of the battery pack, allowing the controller to regulate the battery based on the detected temperature.

Battery Controller and Operation

In general operation, when the user activates the ON-OFF-ON 70 switch to either of the on positions, the battery voltage will be connected to the battery control electronics 62, preferably a microprocessor. The microprocessor control 62 then monitors the ambient temperature and type of battery pack before turning on a Field Effect Transistor (FET) to apply battery voltage to the incandescent lamp. The microprocessor monitors the temperature, battery voltage and tests for shorted lamps on a continuous basis as long as the ON-OFF-ON switch is in either ON position. Now will be described in detail the various functions and routines performed by battery controller 62.

A) Hardware Initialization and Soft Start

When power is first applied to the microprocessor 10, the internal registers are automatically initialized to predetermined states. These states must be modified in order to make the peripherals within the microcontroller work as desired in the application. This hardware initialization does the following:

Selects either input or output function for all I/O (input/output) pins;

Initializes an A/D (analog to digital) converter by selecting the I/O pins that are to be used for analog inputs;

Selects the clock to be used to run the A/D converter and then enable the A/D converter module;

Erases all locations in SRAM (static random access memory);

Applies battery voltage to the lamp 80;

Initializes the timer 0 parameters so that it will cause an interrupt every millisecond; and Enables the interrupts.

After the registers and peripherals inside the microcontroller have been initialized and power has been applied to the incandescent lamp the firmware performs a "soft start" operation in which the current to the lamp is allowed to build slowly. The soft start procedure prevents a large turn on current from flowing into the lamp. By keeping the turn on current low, the service life of the lamp filament is increased and the safety circuit inside the battery pack will not be triggered.

The soft start procedure alternately turns the lamp ON for a fixed period of time then it turns the lamp OFF for an amount of time that will be reduced to zero as the lamp warms up. This ON/OFF cycle is repeated multiple times and in each cycle the OFF time is reduced a small amount. When the off time is nearly zero, the lamp is turned ON continuously and the main program loop is entered.

Figure 2A:
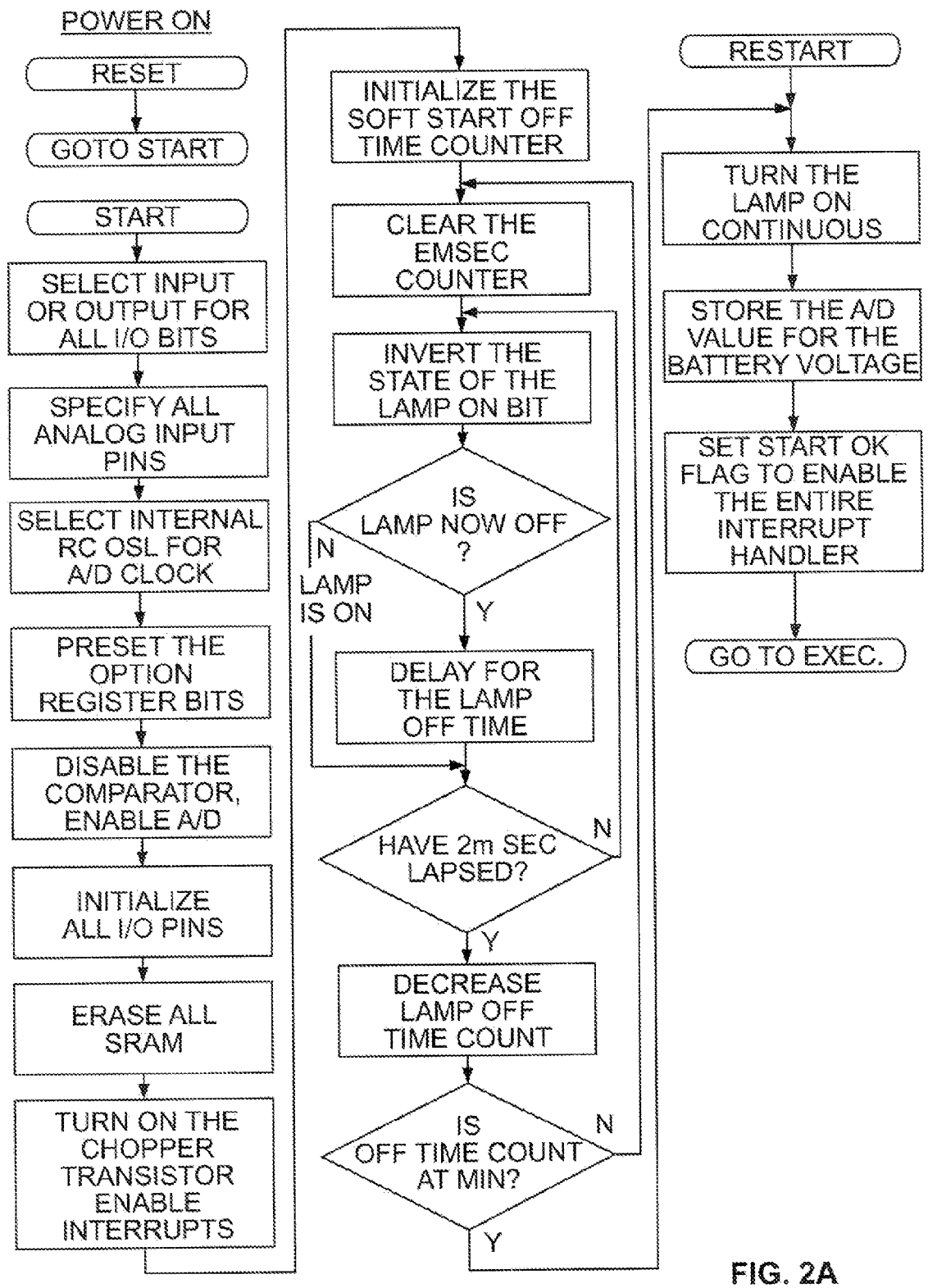
FIG. 2A is a flow diagram of the hardware initialization procedure for the battery controller of the instant invention.
Figure 2B:
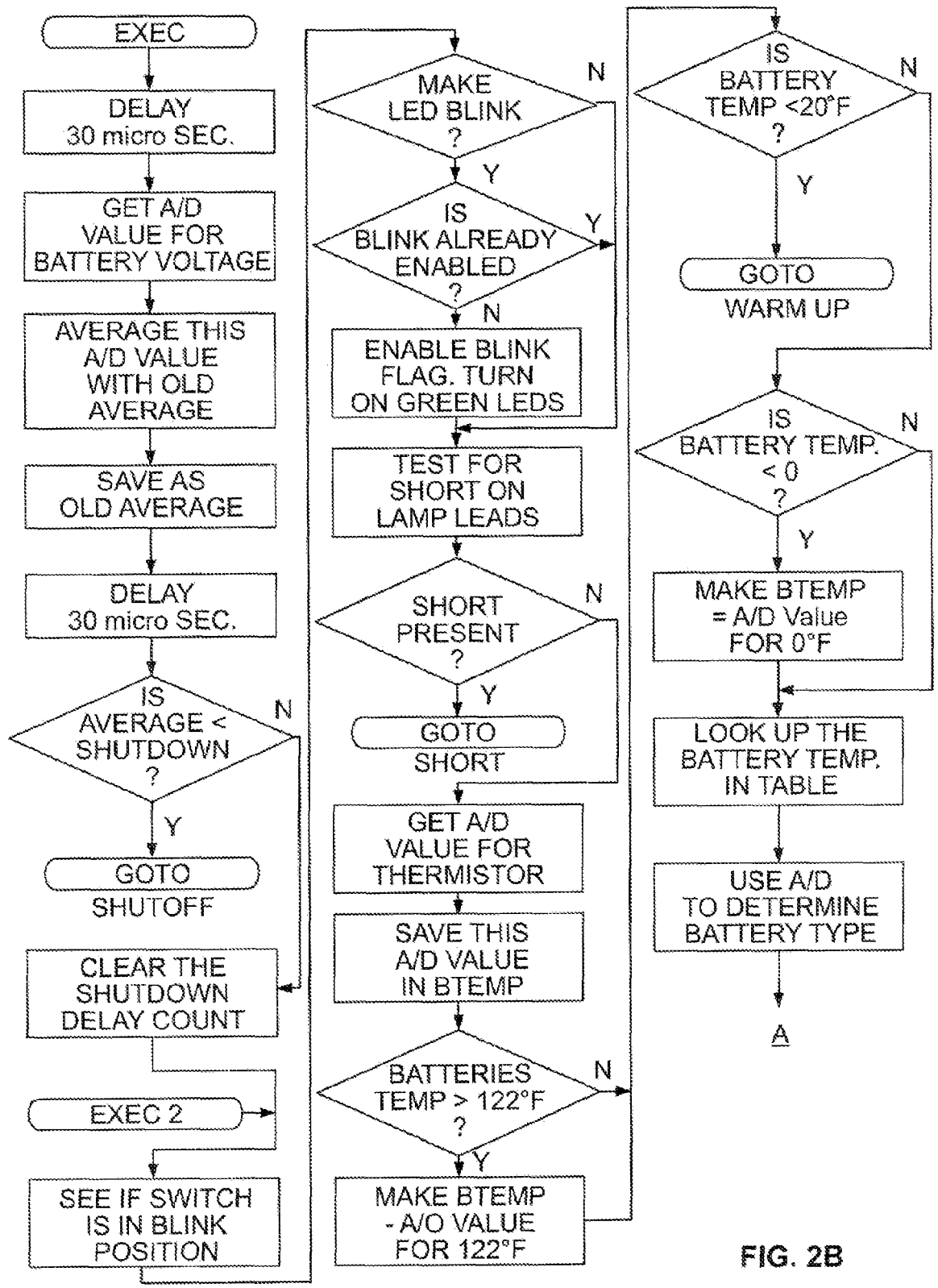
FIG. 2B is a flow diagram of the main program loop and temperature measurement sub-procedure for the battery controller of the instant invention.
Figure 2C:
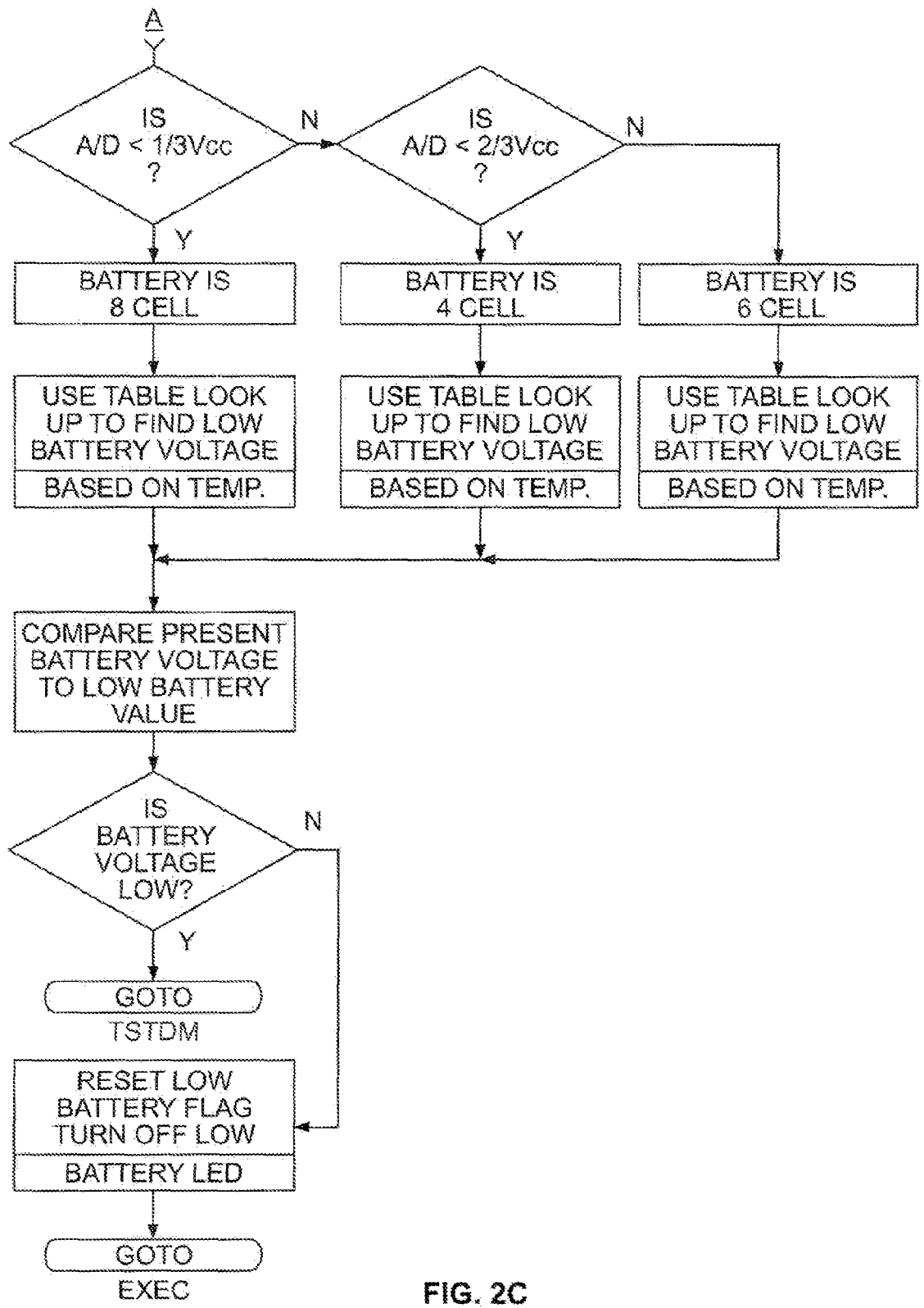
FIG. 2C is a flow diagram of the battery type determination sub-procedure for the battery controller of the instant invention.
Figure 2D:
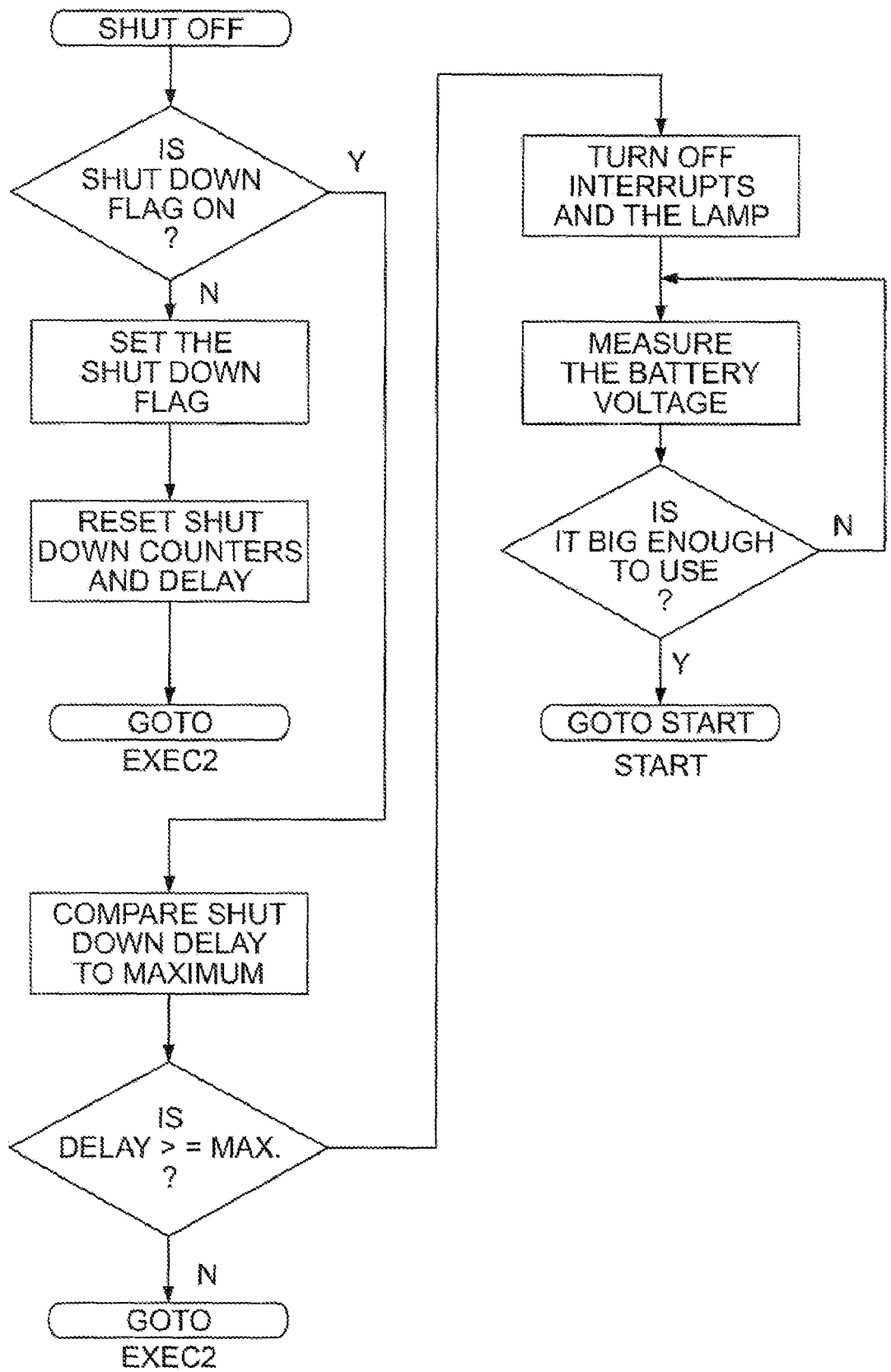
FIG. 2D is a flow diagram of the shut off procedure for the battery controller of the instant invention.
Figure 2E:
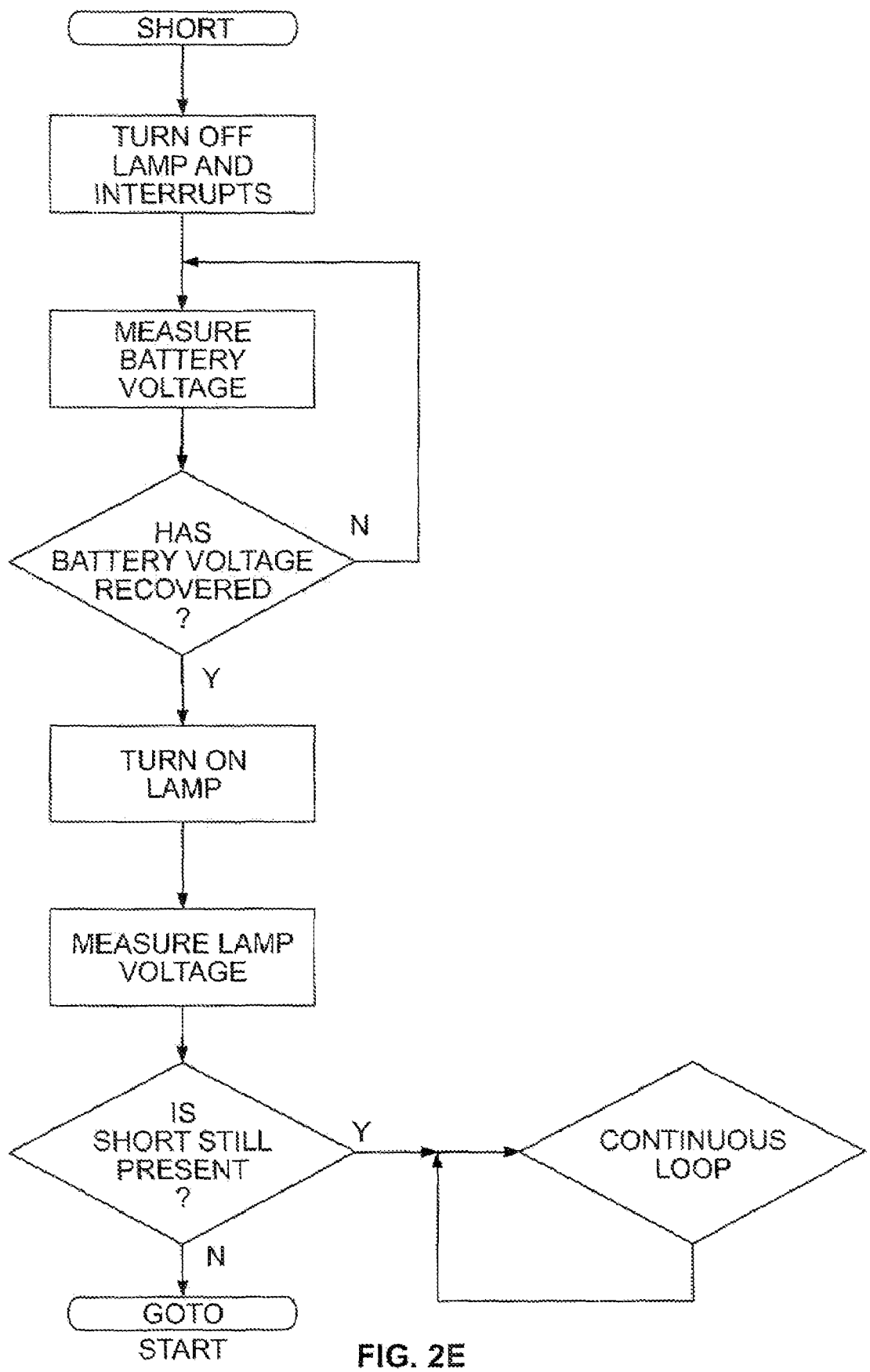
FIG. 2E is a flow diagram of the short detection and handling procedure for the battery controller of the instant invention.
Figure 2F:
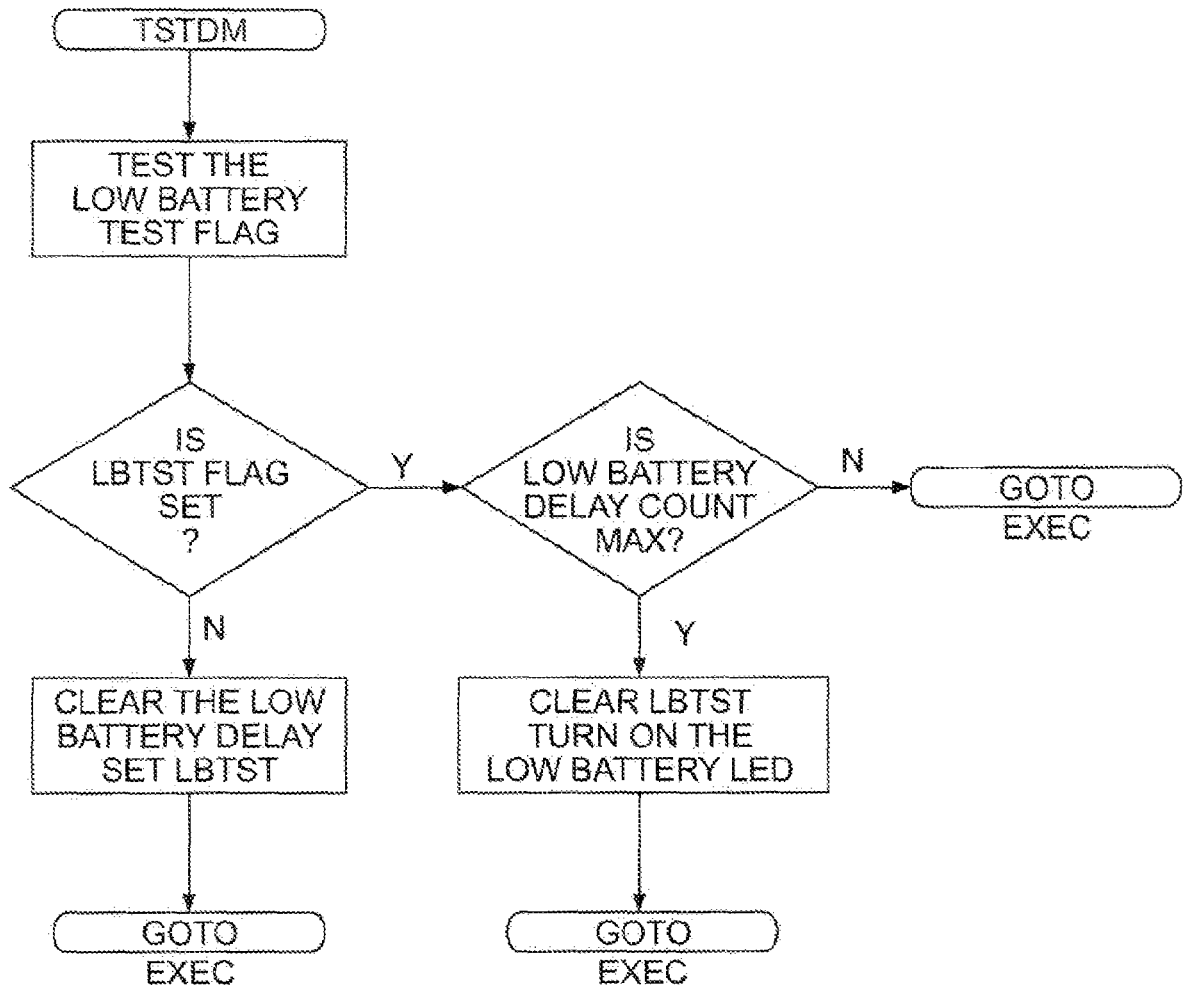
FIG. 2F is a flow diagram of the low battery measurement procedure for the battery controller of the instant invention.
Figure 2G:
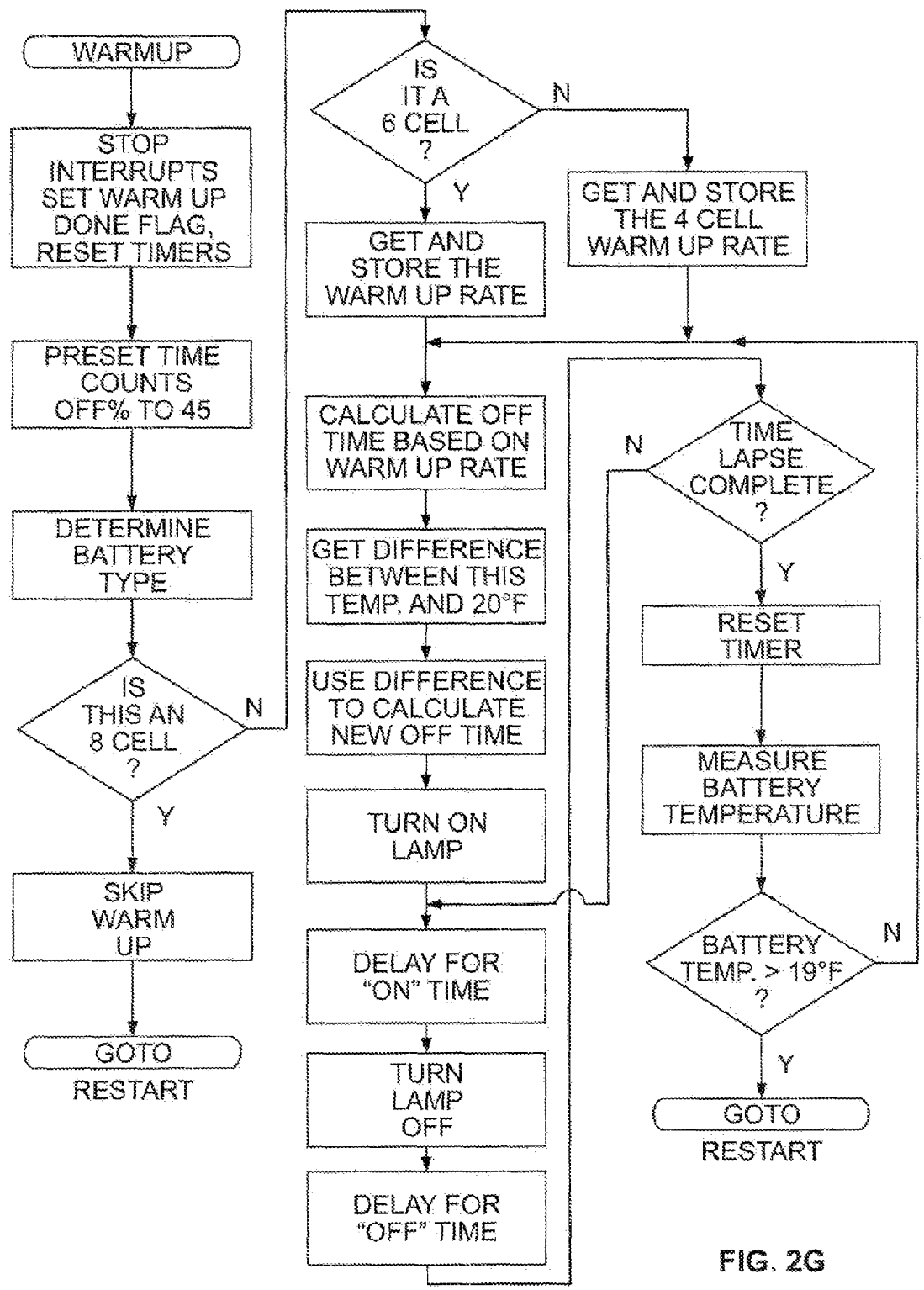
FIG. 2G is a flow diagram of the warm-up procedure for the battery controller of the instant invention.
Figure 2H:
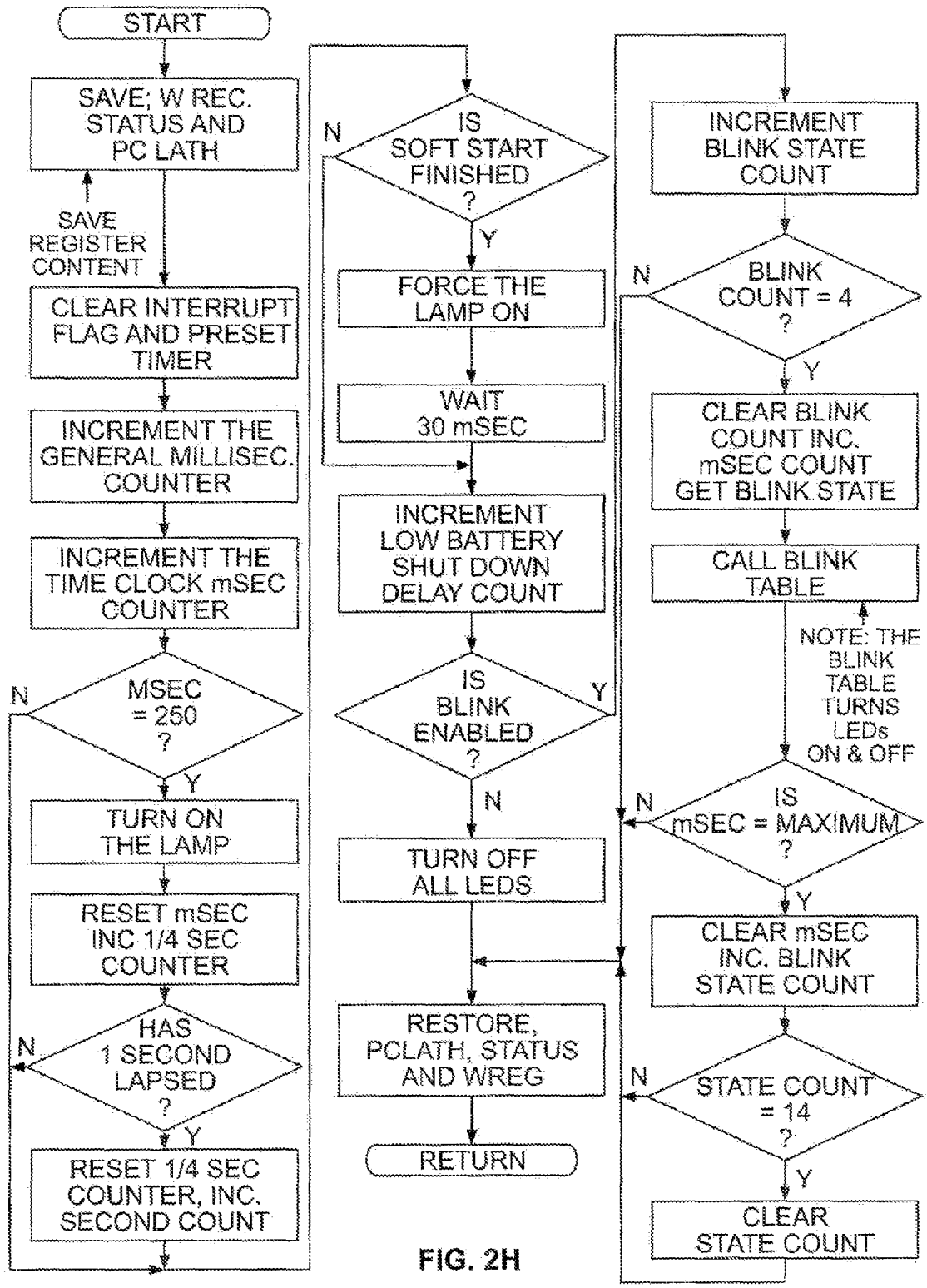
FIG. 2H is a flow diagram of the interrupt handler procedure for the battery controller of the instant invention.

FIG. 2A sets forth one embodiment of the specific steps for such initialization and soft start with FIG. 2H describing the steps of the interrupt handling procedure.

B) Main Program Loop

1) Low Battery Test

Referring now to FIGS. 2B, 2C and 2F, the first task in the main program loop is to obtain a new A/D sample for the battery voltage and average it with a running average. Then, the average value of the battery voltage is compared to the value that requires that the battery be disconnected from the lamp. If the battery voltage is less than the smallest voltage allowable, the firmware will branch to a loop where it continues to monitor the battery voltage for a short while and if after that period of time the battery voltage is still to low to use, the lamp will be turned off and the firmware will remain in a tight loop continuously monitoring battery voltage. If the battery voltage rises above the minimum then the lamp will be turned on again and the firmware will branch to the beginning of the main loop once again.

This monitoring of battery voltage is to make sure that the battery is not over discharged. This will enhance battery life.

If the battery temperature rises, the battery voltage will also rise and if it rises high enough so that the battery voltage is larger than the minimum, the lamp will once again be turned on and the program will branch to the beginning of the main loop.

2) Blink Test and Enable

Again referring to FIG. 2A, after the low battery test, the ON-OFF-ON position of switch 70 is checked by the firmware to determine if the LEDs should flash. If so then a program control flag is set which causes the interrupt handler to evoke blinking.

3) Shorted Lamp Test

Following the blink test the firmware tests to see if the incandescent lamp is shorted, as is shown in FIG. 2E. If a shorted lamp is detected, the lamp 80 is turned OFF and the battery voltage is measured. The program monitors the battery voltage continuously until the battery voltage has recovered from the short. Once the battery 60 has recovered, the lamp 80 is turned on again and the short test is performed again. If a short is still present the lamp is turned off and the firmware branches to a tight loop where it remains until power is removed. If the short is removed, the program branches to the beginning of the main loop.

4) Battery Temperature

As is illustrated in second and third branches the main flow diagram of FIG. 2B, after the shorted lamp test, the battery pack temperature is measured. The battery temperature will be used as an index in a look up table to determine what the "low battery voltage" should be. For all temperatures greater than 122° F. the index should be the same. As such, for all temperatures greater than 122° F., the index will be equal to 122.

Next, a test is made to see if the battery temperature is less than 15° F. If it is, the program branches to a battery pack warm up routine, illustrated in FIG. 2G. Otherwise, the program will proceed to look up the low battery voltage value based on which battery pack is present, illustrated in FIG. 2C, and described below.

5) Low Battery Voltage Test

Once the battery temperature is known and the battery type is known the low battery voltage value is obtained from the table for the type of battery that is present. The low battery voltage value is then compared to the present battery voltage. If the battery voltage is less than the low battery voltage value obtained from the table then a counter is started. When the counter reaches its maximum value the low battery test is made again. If the battery voltage is still too low then the low battery LED will be turned ON. Otherwise the counter is stopped and cleared. After this test the program branches to the beginning of the main loop of FIG. 2B.

6) Warm Up

If the battery temperature is less than 15° F. then a warm up procedure may be required. The exception to this is the 8-cell battery pack that does not require a warm up cycle.

If the battery pack is a 4 or 6 cell type then a warm up rate is calculated for the type of battery pack that is present based on the measured battery temperature. The warm up procedure takes advantage of the fact that when the lamp is on, the current flowing in the lamp also flows in the internal resistances of the batteries and this results in I*I*R heating of the battery. At low temperatures the amount of current that can be drawn from the batteries is reduced but even the reduced amount causes internal heating in the battery. As the battery heats up the allowable load current increases until at 15° F. full load current is permitted. The flow-path of battery warm up procedure is set forth in FIG. 2G.

The warm up cycle is basically an ON/OFF cycle in which the ON time is fixed and the OFF time is reduced as the battery heats up. Once the battery temperature reaches 15° F. the program branches to the beginning of the main loop after turning on the lamp and fully enabling the interrupt handler, as previously described.

Utilizing the aforementioned procedures, as is further detailed in FIGS. 2A-2H, voltage from the battery 60 is continuously monitored, as is temperature. If low voltage is detected by the controller 10, the low battery indicator 90 will be turned on and if below the voltage cut-off set point, the lantern power will be turned off to protect the battery 60 from over discharge. Similarly, if temperature is below a set point when the lantern is turned on, the power will be regulated and slowly ramped up based on temperature feedback from the battery 60 (via thermister 64) until full power is reached.

In addition to the structures, sequences, and uses immediately described above, it will be apparent to those skilled in the art that other modifications and variations can be made the method of the instant invention without diverging from the scope, spirit, or teaching of the invention. As one such example, portable Li-ion powered device such as cell phones and laptop computers can benefit from employing a warm-up routine to enhance cold weather operation. Therefore, it is the intention of the inventors that the description of instant invention should be considered illustrative and the invention is to be limited only as specified in the claims and equivalents thereto.

We claim:

1. In an electronic control module for a battery for a light source, a method of regulating battery power comprising:
   a) initializing the controller;
   b) providing an initial low current to the light source;
   c) testing the battery voltage for an initial low battery condition;
   d) testing for a shorted condition of the light source;
   e) determining a type of the battery connected to the light source;
   f) determining a low battery voltage based on the battery type;
   g) determining if the battery temperature is below a preset level;
   h) if the battery temperature determined in step g) is below the preset level, conducting the additional steps of:
      i. calculating a warm-up rate for the type of battery based on the battery temperature; and
      ii. increasing battery current gradually based on the calculated warm-up rate as the battery warms up due to current flow through an internal resistance of the battery;
   i) determining if the battery voltage is above the low battery voltage;
   j) providing a full battery current to the light source if the battery voltage is above the low battery voltage.

2. The method of regulating battery power of claim 1, wherein the controller further comprises at least one input-output (I/O) pin, an analog-to-digital (A/D) converter, a clock, a timer and static random access memory (SRAM) and the step of initializing the controller further comprises the steps of:
   a) selecting either and input or output function for all I/O (input/output) pins;
   b) initializing the A/D converter by selecting the I/O pins that are to be used for analog inputs;
   c) selecting the clock to be used to run the A/D converter and then enabling the A/D converter;
   d) erasing all locations in SRAM;
   e) initializing the timer parameters so that it will cause an interrupt every millisecond; and
   f) enabling the interrupts.

3. The method of regulating battery power of claim 1 wherein the step of testing the battery voltage for an initial low battery condition further comprises:
   a) obtaining an initial voltage reading from the battery;
   b) comparing the initial voltage reading with a stored value;
   c) determining if said initial voltage is less than the stored value;
   d) turning off the light source if voltage is below the stored value and performing steps a)-c) until initial voltage rises above the stored value; and
   e) applying the voltage to the light source when above the stored value.

4. The method of regulating battery power of claim 1 in a light source having a switch and signal LEDs, comprising the additional steps after conducting the initial low battery voltage test of determining whether said switch is moved a position to actuate the LEDs, determining whether the LEDs should flash and setting a program control flag in an interrupt to evoke blinking.

5. The method of regulating battery power of claim 1 further comprising the step of illuminating a low battery indicator if the battery voltage determined in step i) is below the low battery voltage.

6. The method of regulating battery power of claim 1 wherein step f) is also based on the battery temperature.

7. The method of regulating battery power of claim 1 wherein step b) includes alternatively turning the light source on and off with amount of time that the light source is turned off being reduced to zero as the light source warms up.

8. The method of regulating battery power of claim 1 wherein step h) ii. includes alternatively turning the light source on and off with amount of time that the light source is turned off being reduced to zero as the battery warms up.

9. An electronic control module for regulating a battery for a light source, the control module programmed to perform the steps of:
   a) initializing the controller;
   b) providing an initial low current to the light source;
   c) testing the battery voltage for an initial low battery condition;
   d) testing for a shorted condition of the light source;
   e) determining a type of the battery connected to the light source;
   f) determining a low battery voltage based on the battery type;
   g) determining if the battery temperature is below a preset level;
   h) if the battery temperature determined in step g) is below the preset level, conducting the additional steps of:
      i. calculating a warm-up rate for the type of battery based on the battery temperature; and
      ii. increasing battery current gradually based on the calculated warm-up rate as the battery warms up due to current flow through an internal resistance of the battery;
   i) determining if the battery voltage is above the low battery voltage;
   j) providing a full battery current to the light source if the battery voltage is above the low battery voltage.

10. The electronic control module of claim 9 wherein testing the battery voltage for an initial low battery condition includes:
   i. obtaining an initial voltage reading from the battery;
   ii. comparing the initial voltage reading with a stored value;
   iii. determining if said initial voltage is less than the stored value;
   iv. turning off the light source if voltage is below the stored value and performing steps a)-c) until initial voltage rises above the stored value; and
   applying the voltage to the light source when above the stored value.

11. The electronic control module of claim 9 further comprising the step of illuminating a low battery indicator if the battery voltage determined in step i) is below the low battery voltage.

12. The electronic control module of claim 9 wherein step f) is also based on the battery temperature.

13. The electronic control module of claim 9 wherein step b) includes alternatively turning the light source on and off with amount of time that the light source is turned off being reduced to zero as the light source warms up.

14. The electronic control module of claim 9 wherein step h) ii. includes alternatively turning the light source on and off with amount of time that the light source is turned off being reduced to zero as the battery warms up.

* * * * *